United States Patent
Ide et al.

(10) Patent No.: US 6,978,200 B2
(45) Date of Patent: Dec. 20, 2005

(54) ACTIVATION DEVICE FOR PASSENGER PROTECTION APPARATUS

(75) Inventors: Seiya Ide, Okazaki (JP); Yoshihisa Ogata, Chiryu (JP)

(73) Assignee: Denso Corporation, Kariya (JP)

( * ) Notice: Subject to any disclaimer, the term of this patent is extended or adjusted under 35 U.S.C. 154(b) by 207 days.

(21) Appl. No.: 10/443,800

(22) Filed: May 23, 2003

(65) Prior Publication Data

US 2004/0002802 A1 Jan. 1, 2004

(30) Foreign Application Priority Data

Jun. 27, 2002 (JP) .............................. 2002-187580

(51) Int. Cl.⁷ .............................................. B60R 21/32
(52) U.S. Cl. .................... 701/45; 701/70; 340/429; 340/440; 280/755
(58) Field of Search .............................. 701/1, 45, 70; 340/429, 440; 280/735, 755; 180/282

(56) References Cited

U.S. PATENT DOCUMENTS

| | | | |
|---|---|---|---|
| 6,282,474 B1 * | 8/2001 | Chou et al. | 701/45 |
| 6,529,811 B2 * | 3/2003 | Watson et al. | 701/45 |
| 6,594,570 B2 * | 7/2003 | Nagao et al. | 701/45 |
| 6,611,784 B2 | 8/2003 | Tobaru et al. | |
| 6,650,981 B2 * | 11/2003 | Sekizuka et al. | 701/45 |
| 6,694,225 B2 * | 2/2004 | Aga et al. | 701/1 |
| 2004/0162654 A1 * | 8/2004 | Lu et al. | 701/38 |
| 2004/0176893 A1 * | 9/2004 | Ogata et al. | 701/45 |
| 2004/0199317 A1 * | 10/2004 | Ogata et al. | 701/45 |
| 2005/0004730 A1 * | 1/2005 | Suzuki et al. | 701/38 |

FOREIGN PATENT DOCUMENTS

| | | |
|---|---|---|
| JP | 7-164985 | 6/1995 |
| JP | A-2000-127891 | 5/2000 |
| JP | 2001-260785 | 9/2001 |
| JP | A-2001-260701 | 9/2001 |

OTHER PUBLICATIONS

Notice of Rejection/Communication from Japanese Patent Office in Japanese application No. 2002-187580 which is a counterpart Japanese application of U.S. Appl. No. 10/443, 800 (English translation attached) mailed Jan. 28, 2005.

* cited by examiner

*Primary Examiner*—Gary Chin
(74) *Attorney, Agent, or Firm*—Posz Law Group, PLC

(57) ABSTRACT

An activation device for a passenger protection apparatus is made up of a sensor for detecting a roll angular velocity of a vehicle, a unit for calculating a roll relative angle on the basis of the roll angular velocity, and a unit for making a judgment indicating a roll of the vehicle when the velocity and the angle satisfy a threshold condition. A control unit activates an air bag when making a judgment indicating a roll. A vehicle collision state is discriminated on the basis of right-hand and left-hand accelerations detected by acceleration sensors and the threshold condition for the judgment on a roll of the vehicle is switched in accordance with the collision state. This enables a trip-over type roll to be detected at an early stage for activating the passenger protection apparatus quickly.

7 Claims, 8 Drawing Sheets

ACTIVATION DEVICE FOR PASSENGER PROTECTION APPARATUS

BACKGROUND OF THE INVENTION

1) Field of the Invention

The present invention relates to an activation device for a passenger protection apparatus to be mounted in a vehicle, and more particularly to a technique for activating a passenger protection apparatus at an appropriate timing in response to the occurrence of a roll (rollover) of a vehicle.

2) Description of the Related Art

So far, as a vehicle-mounted passenger protection apparatus for protecting a passenger(s) (including a driver) from the occurrence of a roll of a vehicle, for example, there have been proposed a curtain air bag designed to spread into a curtain-like configuration along a side surface portion of the vehicle, a seat belt with a pretensioner made to take up a seat belt in no time, and an apparatus made to take up a seat belt in a repeated fashion through the use of a motor or the like.

Figure 8:
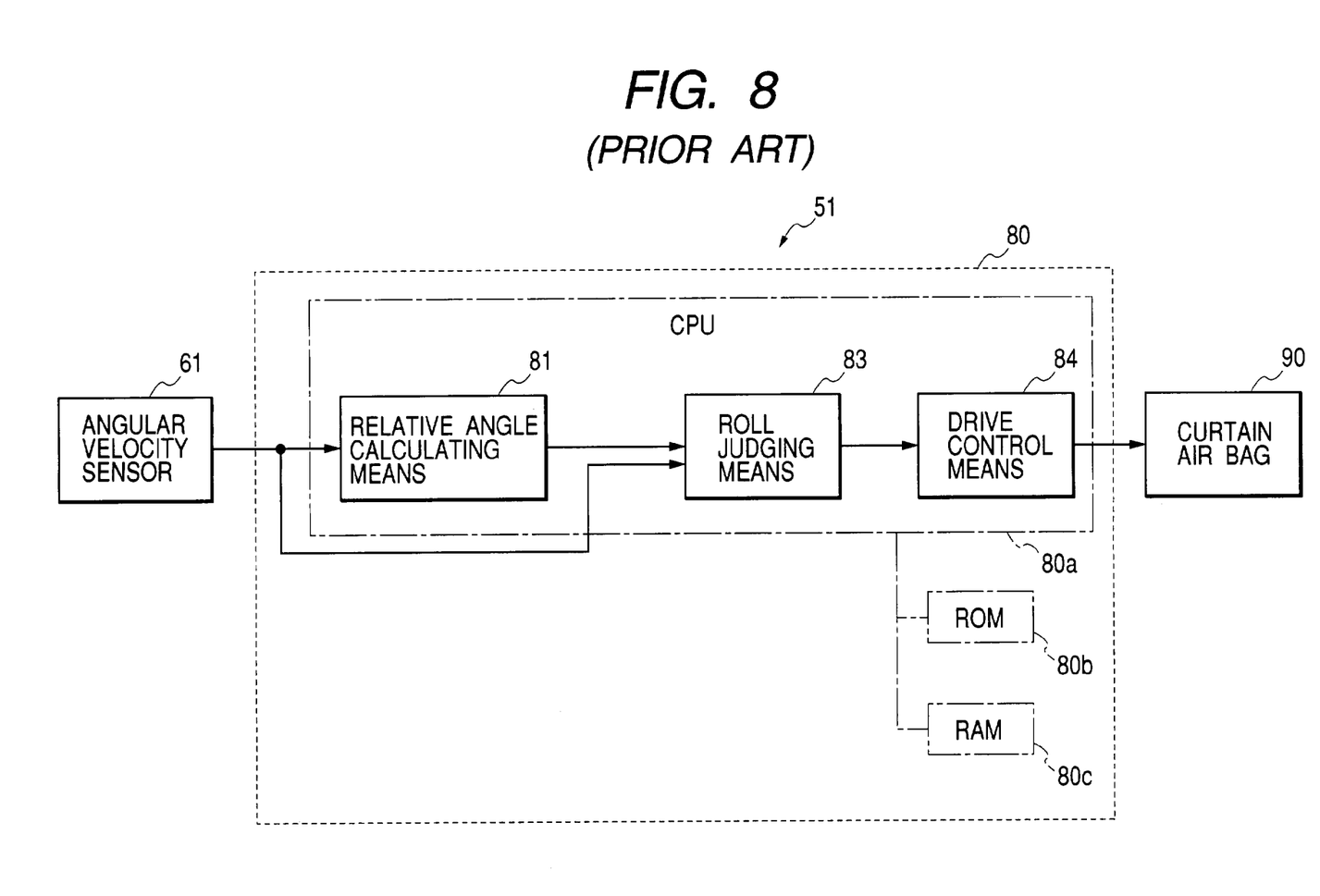
FIG. 8 is a block diagram schematically showing a configuration of a passenger protection apparatus activation system according to a conventional technique.

For example, as shown in a block diagram of FIG. 8, a conventional activation system 51 for a passenger protection apparatus is made up of an angular velocity sensor 61 for detecting a roll angular velocity of a vehicle, a control unit 80 including a CPU 80a, a ROM 80b and a RAM 80c, and a curtain air bag 90. When the angular velocity sensor 61 outputs a roll angular velocity signal, a relative angle calculating means 81 makes an integral calculation of a roll angular velocity to obtain a roll relative angle, and a roll judging means 83 makes a decision that the vehicle rolls sideways if the roll angular velocity and the roll relative angle exceed a predetermined condition, and then a drive control means 84 activates a curtain air bag 90.

However, among rolls of a vehicle, there are diverse modes and, in some modes, there should be a need to make a judgment on a roll of a vehicle at an earlier stage. For example, if a vehicle does a sideslip to make its tire(s) collide against a curb stone on a road, a large impact acceleration and a large angular velocity occur, which can increase a rolling speed rapidly to lead to a roll of the vehicle. In the case of such a roll of the so-called trip-over type, since a passenger(s) existing on a seat is shifted toward the exterior of the vehicle body (a door side) due to an inertia when the tire collides against the curb stone or the like to decrease the sideslip speed, there is a possibility of hindering a smooth spread of a curtain air bag taking place along a side surface portion of the vehicle. On the other hand, also in the case of a seat belt with a pretensioner or an apparatus made to take up a seat belt in a repeated fashion through the use of a motor or the like, not until the seat belt is taken up at an early stage, the throw-out of a passenger into the exterior of the vehicle or the collision thereof against an internal member of the motor vehicle is effectively preventable.

Therefore, in a case in which a tire collides against a curb stone or the like, or in a like situation, there is a need to detect the occurrence of the trip-over type roll earlier for quickly operating a passenger protection device, such as a curtain air bag, a seat belt with a pretentioner and an apparatus made to take up a seat belt in a repeated fashion through the use of a motor or the like.

SUMMARY OF THE INVENTION

The present invention has been developed with a view to eliminating the above-mentioned problems, and it is therefore an object of the invention to provide an activation device for a passenger protection apparatus, capable of detecting a trip-over type roll at an earlier stage for activating the passenger protection apparatus quickly.

For this purpose, in accordance with a first aspect of the present invention, there is provided an activation device for a passenger protection apparatus which is made to activate the passenger protection apparatus in accordance with a behavior of a vehicle, comprising an angular velocity sensor for detecting a roll angular velocity of the vehicle, relative angle calculating means for calculating a roll relative angle of the vehicle on the basis of the roll angular velocity detected by the angular velocity sensor, roll judging means for making a judgment indicating the occurrence of a roll of the vehicle when the roll angular velocity detected by the angular velocity sensor and the vehicle roll relative angle calculated by the relative angle calculating means satisfy a predetermined threshold condition, drive control means for activating the passenger protection apparatus when the roll judging means makes the vehicle roll judgment, a plurality of acceleration sensors for detecting accelerations of the vehicle in its right- and left-hand directions, collision state discriminating means for making a discrimination of a collision state of the vehicle on the basis of the accelerations detected by the plurality of acceleration sensors, and threshold switching means for setting the predetermined threshold condition for the judgment on the vehicle roll in accordance with the collision state discriminated by the collision state discriminating means.

Thus, the plurality of acceleration sensors detect accelerations of the vehicle in its right-hand and left-hand directions, and the collision state discriminating means makes a discrimination of a collision state of the vehicle (that is, the occurrence and non-occurrence of collision, the occurrence and non-occurrence of the deformation of the vehicle, and others) on the basis of the accelerations respectively detected by the plurality of acceleration sensors, and then the threshold switching means sets a predetermined threshold condition for the judgment on a roll of the vehicle in accordance with the collision state discriminated by the collision state discriminating means. Moreover, the angular velocity sensor detects a roll angular velocity of the vehicle, and the relative angle calculating means calculates a roll relative angle of the vehicle on the basis of the roll angular velocity detected by the angular velocity sensor, and then the roll judging means makes a judgment indicating the occurrence of a roll of the vehicle when the roll angular velocity detected by the angular velocity sensor and the vehicle roll relative angle calculated by the relative angle calculating means satisfy the predetermined threshold condition set by the threshold switching means, while the drive control means activates the passenger protection apparatus when the roll judging means makes a judgment that a roll of the vehicle has occurred.

Accordingly, since the threshold condition for the judgment on the occurrence of a roll of the vehicle is set in accordance with a collision state of the vehicle, the passenger protection apparatus is effectively activable by making a roll judgment at an appropriate timing corresponding to the type of a roll.

In addition, according to a second aspect of the present invention, in the activation device for a passenger protection apparatus stated above, the roll judging means sets a threshold line on a two-dimensional map using the roll angular velocity and the roll relative angle as parameters and makes a judgment indicating the occurrence of a roll of the vehicle when a history line drawn on the basis of the roll angular velocity detected by the angular velocity sensor and the roll relative angle calculated by the relative angle calculating means runs from a non-roll area lying on a side of an origin with respect to the threshold line to a roll area lying on a side opposite to the origin with respect to the threshold line, and the threshold switching means sets the threshold line in accordance with the collision state discriminated by the collision state discriminating means.

Thus, the threshold line for use in the judgment on the occurrence of a roll of the vehicle is set in accordance with the collision state of the vehicle, thereby making a judgment on a vehicle roll at a proper timing corresponding to the type of the roll.

Still additionally, according to a third aspect of the present invention, in the activation device for a passenger protection apparatus stated above, the plurality of acceleration sensors includes a first acceleration sensor located at a predetermined position of the vehicle for detecting and outputting a first acceleration and a second acceleration sensor located at another predetermined position different from the first-mentioned predetermined position in right-hand and left-hand directions of the vehicle for detecting and outputting a second acceleration, and the threshold switching means includes collision judging means for making a judgment indicating the occurrence of a collision against a side surface of the vehicle when the first acceleration exceeds a predetermined value or when the second acceleration exceeds another predetermined value and a phase difference discriminating means for, when the collision judging means makes a judgment that a collision occurs against the side surface of the vehicle, making a discrimination as to whether or not a phase difference between the first and second accelerations is below a predetermined phase difference, and when the collision judging means makes a judgment indicating no collision against the side surface of the vehicle, a normal judgment threshold line is set as the threshold line and when the collision judging means makes a judgment indicating the occurrence of a collision against the side surface of the vehicle and the phase difference discriminating means makes a discrimination of the phase difference between the first and second accelerations being below the predetermined phase difference, a trip-over type judgment threshold line is set as the threshold line, and further when the collision judging means makes a judgment indicating the occurrence of a collision against the side surface of the vehicle and the phase difference discriminating means makes a discrimination of the phase difference between the first and second accelerations being equal to or more than the predetermined phase difference, a side collision judgment threshold line is set as the threshold line.

Thus, a discrimination is surely made among a case of no occurrence of a collision against a side surface of the vehicle, a case of the occurrence of a collision against the side surface of the vehicle but no deformation of the vehicle and a case of the occurrence of a collision against the side surface of the vehicle accompanied by the occurrence of a deformation of the vehicle and, on a two-dimensional map, a threshold line is set in accordance of each of the cases, thereby ensuring a roll judgment at a proper timing corresponding to a roll type.

Yet additionally, according to a fourth aspect of the present invention, in the activation device for a passenger protection apparatus stated above, the trip-over type judgment threshold line is set closer to the origin than the normal judgment threshold line and the side collision judgment threshold line on the two-dimensional map.

Accordingly, in a case in which a possibility that a trip-over type roll occurs due to a collision against a side surface of the vehicle accompanied by no deformation of the vehicle is high, owing to the arrangement that the trip-over type judgment threshold line is set closer to the origin than the normal judgment threshold line and the side collision judgment threshold line on the two-dimensional map, a roll is detectable at an early stage, which allows the passenger protection apparatus to be activable quickly.

Moreover, in accordance with a fifth aspect of the present invention, there is provided an activation device for a passenger protection apparatus which is made to activate the passenger protection apparatus in accordance with a behavior of a vehicle, comprising roll detecting means for detecting a rotation of the vehicle in its right-hand and left-hand directions, roll judging means for making a judgment on a roll of the vehicle on the basis of a result of the detection by the roll detecting means, drive control means for activating the passenger protection apparatus when the roll judging means makes a judgment indicating the occurrence of a roll of the vehicle, and trip-over type discriminating means for making a discrimination of a possibility of the occurrence of a trip-over type roll, the roll judging means making a judgment indicating the occurrence of a roll of the vehicle at an earlier timing than normal when the trip-over type discriminating means discriminates a high possibility of the occurrence of a trip-over type roll.

Thus, the trip-over type discriminating means discriminates a possibility of the occurrence of a trip-over type roll, and the roll detecting means detects a rotation of the vehicle in its right-hand and left-hand directions, and then, on the basis of the detection result from the roll detecting means, the roll judging means makes a judgment indicating the occurrence of a roll of the vehicle at an earlier timing than normal when the trip-over type discriminating means discriminates that a possibility of the occurrence of a trip-over type roll is high.

Accordingly, since the judgment indicating the occurrence of a roll of the vehicle is made at an earlier timing than normal in a case in which a possibility of the occurrence of a trip-over type roll is high, a quick activation of the passenger protection apparatus is feasible in a case in which a tire collides against a curb stone or the like due to a sideslip of the vehicle so that the vehicle leads to making a roll rapidly.

Still moreover, according to a sixth aspect of the present invention, in the activation device for a passenger protection apparatus stated above, the passenger protection apparatus includes at least one of a curtain air bag designed to spread into a curtain-like configuration along a side surface portion of the vehicle, a seat belt with a pretensioner and an apparatus made to take up a seat belt in a repeated fashion through the use of a motor or the like.

Thus, at least one of a curtain air bag, a seat belt with a pretensioner and an apparatus made to take up a seat belt in a repeated fashion through the use of a motor or the like is activable at an appropriate timing, thereby protecting a passenger(s) securely.

Furthermore, in accordance with a seventh aspect of the present invention, there is provided an activation device for a passenger protection apparatus which is made to activate the passenger protection apparatus in accordance with a behavior of a vehicle, comprising roll judging means for detecting a behavior of the vehicle to make a judgment indicating the occurrence of a roll of the vehicle when the vehicle behavior detected satisfies a predetermined condition, drive control means for activating the passenger protection apparatus when the roll judging means makes a judgment indicating the occurrence of a roll of the vehicle, a plurality of acceleration sensors for detecting accelerations of the vehicle in its right-hand and left-hand directions, collision state discriminating means for making a discrimination of a collision state of the vehicle on the basis of each of the accelerations detected by the plurality of acceleration sensors, and threshold switching means for setting the predetermined condition for the judgment on a roll of the vehicle in accordance with the collision state discriminated by the collision state discriminating means.

Still furthermore, in accordance with an eighth aspect of the present invention, there is provided an activation device for a passenger protection apparatus which is made to activate the passenger protection apparatus in accordance with a behavior of a vehicle, comprising roll judging means for detecting a behavior of the vehicle to make a judgment indicating the occurrence of a roll of the vehicle when the vehicle behavior detected satisfies a predetermined condition, drive control means for activating the passenger protection apparatus when the roll judging means makes a judgment indicating the occurrence of a roll of the vehicle, and trip-over type discriminating means for making a discrimination of a possibility of the occurrence of a trip-over type roll, the roll judging means making a judgment indicating the occurrence of a roll of the vehicle at an earlier timing than normal when the trip-over type discriminating means makes a discrimination of a high possibility of the occurrence of a trip-over type roll.

BRIEF DESCRIPTION OF THE DRAWINGS

Other objects and features of the present invention will become more readily apparent from the following detailed description of the preferred embodiments taken in conjunction with the accompanying drawings in which.

DESCRIPTION OF THE PREFERRED EMBODIMENTS

An embodiment of an activation device for a passenger protection apparatus according to the present invention will be described hereinbelow with reference to the drawings.

Figure 1:
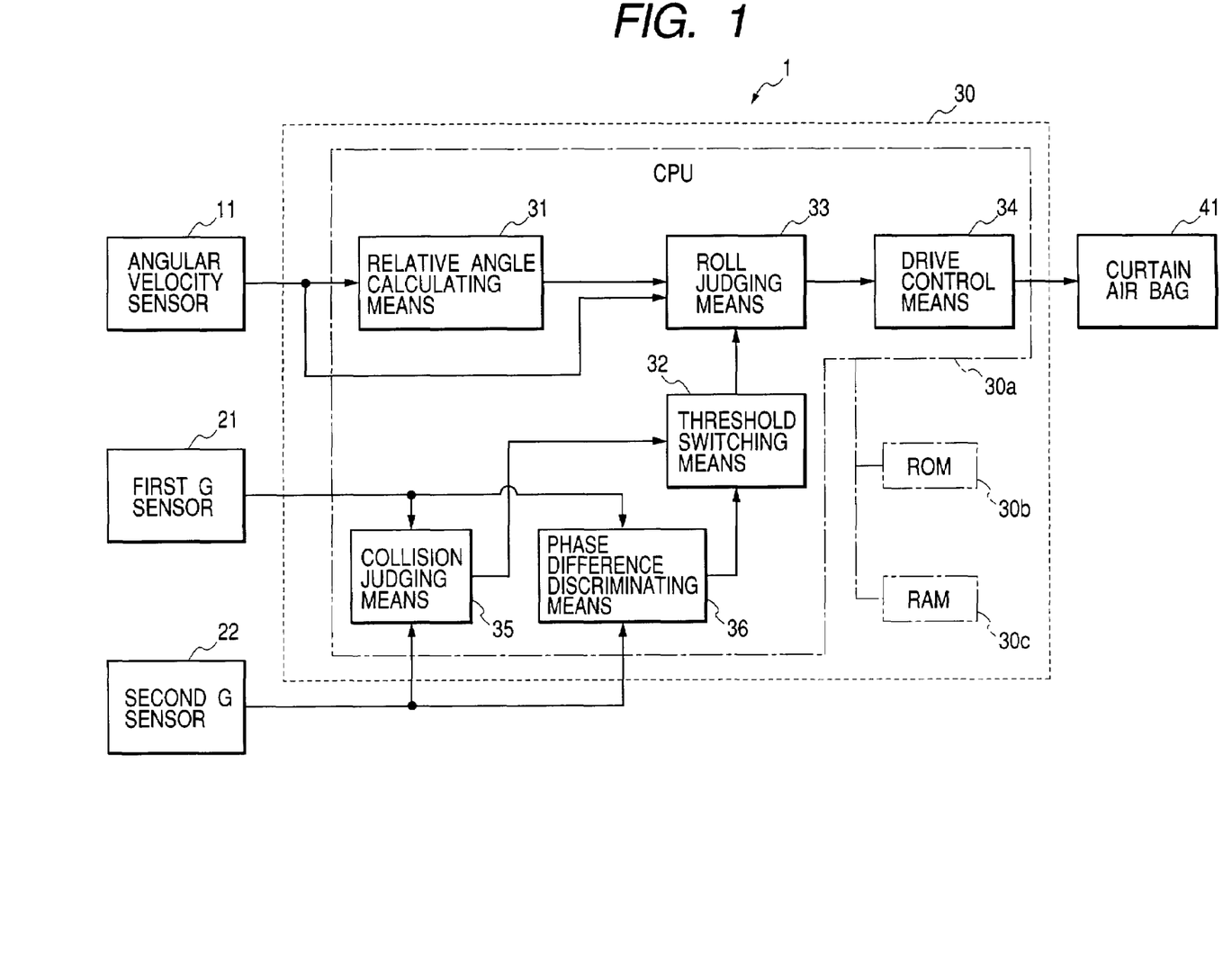
FIG. 1 is a block diagram schematically showing a configuration of a passenger protection apparatus activation system according to an embodiment of the present invention.

FIG. 1 is a block diagram showing the entire configuration of a passenger protection apparatus activation system 1 according to an embodiment of the present invention.

As FIG. 1 shows, the passenger protection apparatus activation system is made up of an angular velocity sensor 11, a first G sensor 21, a second G sensor 22, a control unit 30 and a curtain air bag 41. The first G sensor 21 constitutes a first acceleration sensor in the present invention while the second G sensor 22 forms a second acceleration sensor therein.

Figure 2:
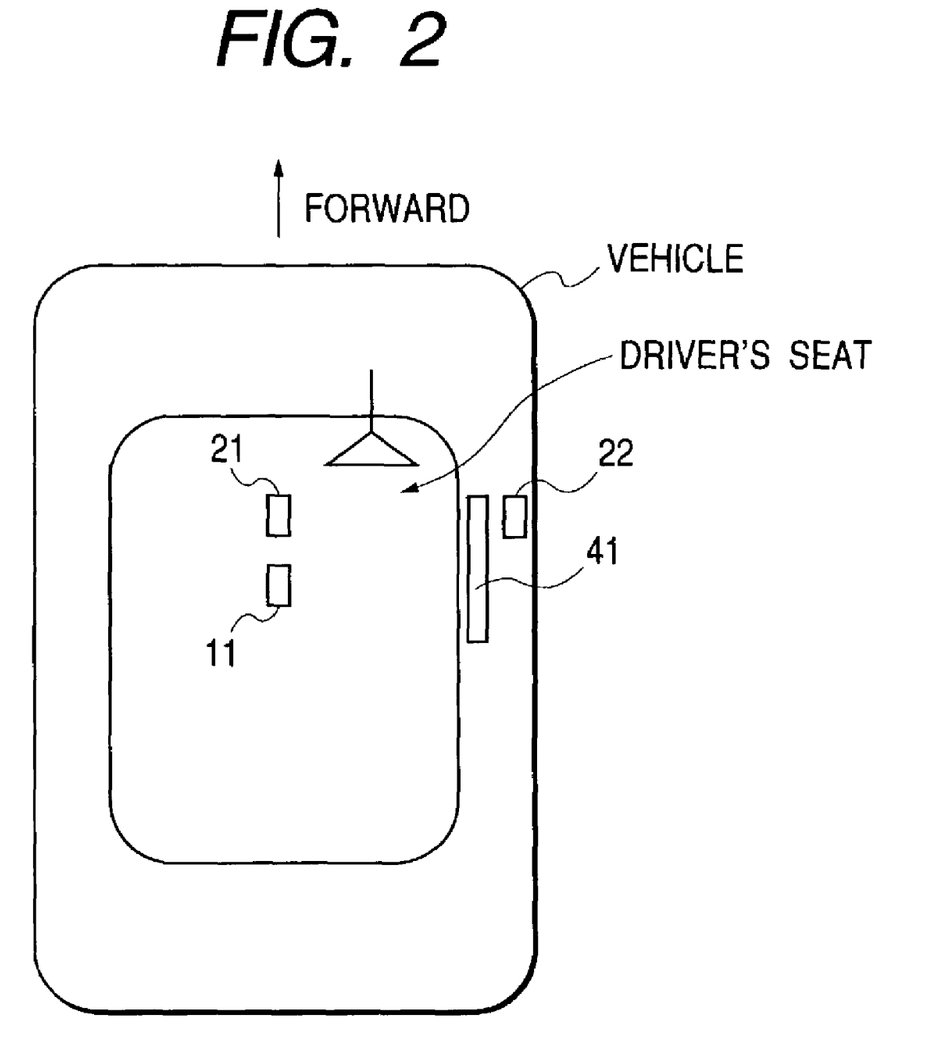
FIG. 2 is a plan view illustratively showing locations of components in a vehicle.

As FIG. 2 shows, the curtain air bag 41 is provided above a driver's seat side roof in the interior of a motor vehicle and is of a type spreading into a curtain-like configuration along a side surface portion of the vehicle, and functions as a kind of passenger protection apparatus for, at the occurrence of a roll of the vehicle, preventing a passenger(s) from being thrown out into the exterior of the vehicle (in a case in which a window is in an open state) or preventing the passenger from colliding against an internal member such as a door of the vehicle (in a case in which a window is in a closed state or in a slightly open state).

The control unit 30 is composed of a CPU 30a, a ROM 30b and a RAM 30c, and the CPU 30a reads out and executes a control program(s) stored in the ROM 30b, thereby realizing a relative angle calculating means 31, a threshold switching means 32, a roll judging means 33, a drive control means 34, a collision judging means 35 and a phase difference discriminating means 36. The processing to be conducted in the CPU 30a will be described later.

The angular velocity sensor 11 is provided at a central portion of the interior of the vehicle as shown in FIG. 2 for detecting a roll signifying a motion of the vehicle in its right-hand and left-hand directions to output it in the form of a roll angular velocity signal. For example, as the angular velocity sensor 11, it is possible to use a sensor of the type detecting a rotation angular velocity through the use of the Coriolis force.

The first G sensor 21 is provided at a horizontal-direction central portion of the interior of the vehicle as shown in FIG. 2 for detecting an acceleration in right-hand and left-hand directions to output it as an acceleration signal.

The second G sensor 22 is located on the right-hand side (driver's seat side) of the interior of the vehicle as shown in FIG. 2 for detecting an acceleration in right-hand and left-hand directions to output it as an acceleration signal.

The first G sensor 21 and the second G sensor 22 are made to detect, in the form of a positive value, an acceleration developing on the basis of a collision of a right-hand wall of the vehicle against an obstacle. The locations of both the sensors 21 and 22 are not limited to the positions mentioned above, but positions different from each other in right-hand and left-hand directions of the vehicle are also acceptable.

Secondly, referring to a flow chart of FIG. 3, a description will be given hereinbelow of a flow of the processing of a passenger protection apparatus activation main routine.

First, a roll judgment threshold switching routine is implemented in order to store a roll judgment threshold corresponding to a collision state of a vehicle in a storage area of the RAM 30c (step 1, which will hereinafter be referred to simply as "S1", and other steps will be expressed in like manner). The processing contents of the roll judgment threshold switching routine will be described in detail later.

Furthermore, a roll angular velocity signal is read out from the angular velocity sensor 11 (S2) and a roll relative angle θ of the vehicle is calculated by integrating a roll angular velocity ω (S3). In this case, the roll relative angle of the vehicle signifies a relative roll angle with respect to a posture of a vehicle at the time of the turning-on of a power switch of the vehicle and indicates an inclination of the vehicle in right-hand and left-hand directions after the turning-on of the power switch. Moreover, the detection of the rotation of the vehicle in its right-hand and left-hand directions is realizable by detecting the roll angular velocity and the roll relative angle.

Figure 5:
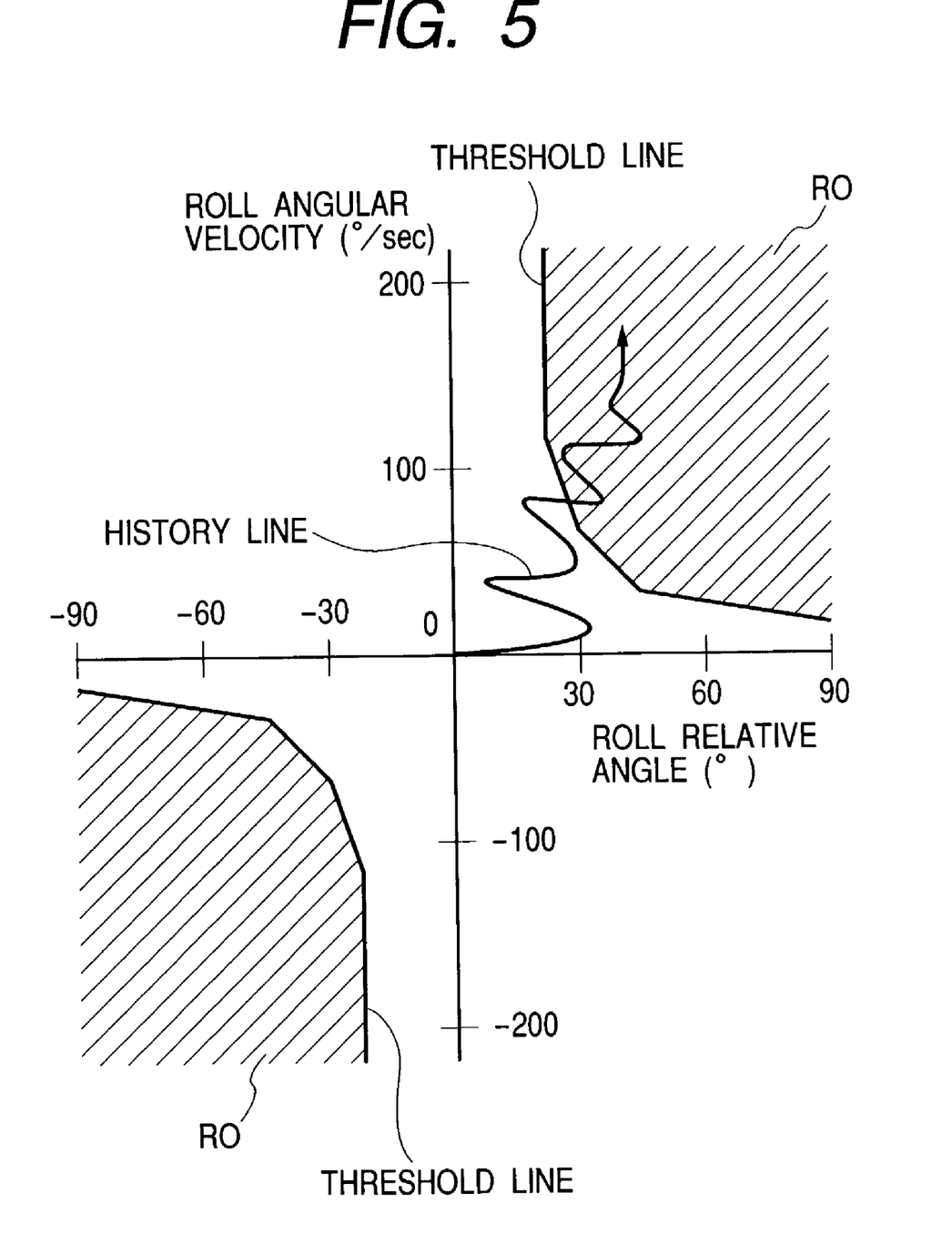
FIG. 5 is an illustration of a two-dimensional map indicating a roll area R0 based on roll angular velocities and roll relative angles for judgment on the occurrence of a roll.

Subsequently, as shown in FIG. 5, a threshold line is set on a two-dimensional map using a roll angular velocity and a roll relative angle as parameters, and a judgment is made as to whether or not a history line based on a roll angular velocity detected by the angular velocity sensor 21 and a roll relative angle calculated by the relative angle calculating means 31 (S3) runs from a non-roll area lying on a side of the origin 0 with respect to the threshold line and goes across the threshold line to enter a roll area R0 lying on a side opposite to the origin 0 with respect to the threshold line (S4). The threshold line on the two-dimensional map shown in FIG. 5 is determined in the roll judgment threshold switching routine in S1 and is put in a storage area of the RAM 30c.

If the history of the roll angular velocity ω and the roll relative angle θ does not exceed the threshold line (S4: No), the processing S1 and subsequent processing are repeatedly conducted.

On the other hand, if the history of the roll angular velocity ω and the roll relative angle θ exceeds the threshold line and enters the roll area R0, a vehicle roll judgment is made to execute drive control for activating the curtain air bag 41 (S5).

Figure 3:
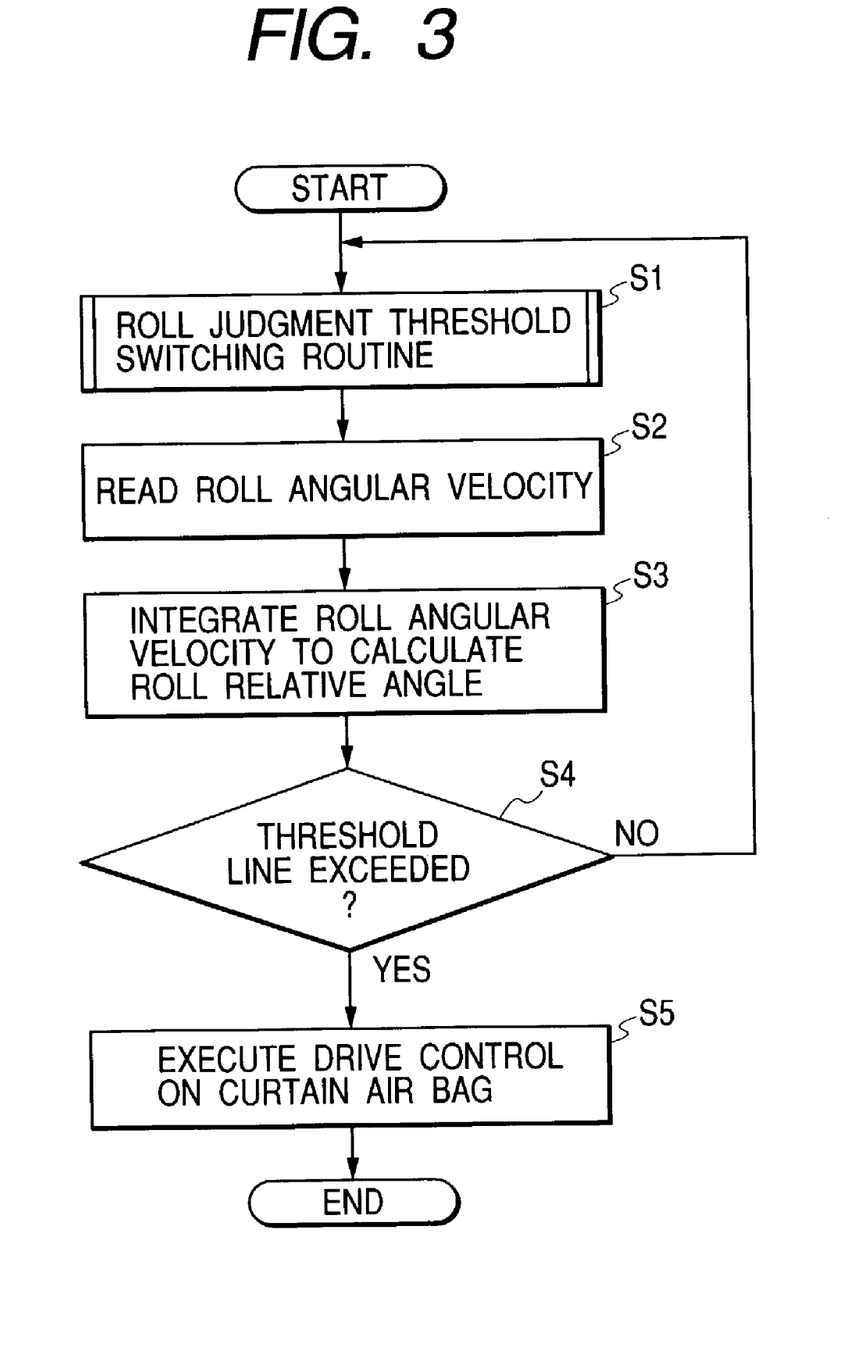
FIG. 3 is a flow chart showing a flow of processing of a passenger protection apparatus activation main routine.

The steps S3, S4 and S5 in the flow chart of FIG. 3 correspond to the relative angle calculating means 31, the roll judging means 33 and the drive control means 34 in the block diagram of FIG. 1, respectively, and the angular velocity sensor 21 and the relative angle calculating means 31 correspond to the roll detecting means in the present invention.

In addition, referring to a flow chart of FIG. 4, a description will be given hereinbelow of a flow of the processing of a roll judgment threshold switching routine. The roll judgment threshold switching routine signifies a processing routine in which a judgment on a collision state of a vehicle is made on the basis of the outputs of the first and second G sensors 21 and 22 to set a roll judgment threshold according to that collision state.

That is, acceleration data GY1 (first acceleration) and GY2 (second acceleration) in right-hand and left-hand directions are read out from the first and second G sensors 21 and 22, respectively (S11).

Following this, the acceleration data GY1 is compared with a first predetermined acceleration GY1th, while the acceleration data GY2 is compared with a second predetermined acceleration GY2th (S12).

If GY1 is lower than GY1th and GY2 is lower than GY2th (S12: No), a judgment is made as no occurrence of a collision against a side surface of the vehicle, a normal judgment threshold is put in a storage area of the RAM 30c (S13) and the operational flow returns to the main routine shown in FIG. 3.

On the other hand, if GY1 is equal to or higher than GY1th and GY2 is equal to or higher than GY2th (S12: Yes), a judgment is made that a collision against a side surface of the vehicle occurs, and the step S14 and subsequent processing are conducted.

Figure 6A:
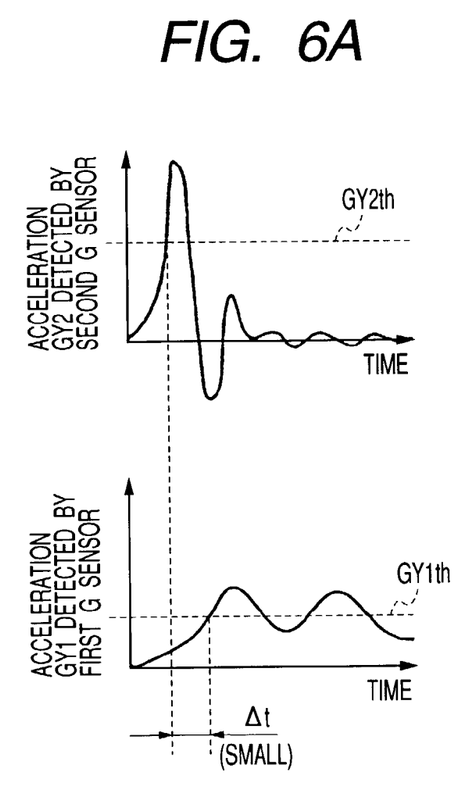
FIG. 6A is a graphic illustration of variation of detection acceleration from a first G sensor and detection acceleration from a second G sensor with the passage of time in the case of the occurrence of a collision against a side surface of a vehicle, and shows a case in which a phase difference is small.
Figure 6B:
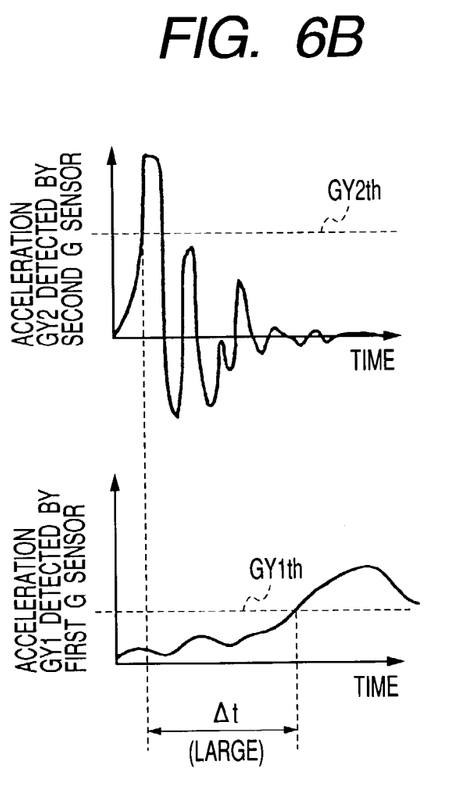
FIG. 6B is a graphic illustration of variation of detection acceleration from a first G sensor and detection acceleration from a second G sensor with the passage of time in the case of the occurrence of a collision against a side surface of a vehicle, and shows a case in which a phase difference is large.

That is, a phase difference φ between the acceleration data GY1 and GY2 is calculated (S14). In this case, as shown in FIGS. 6A and 6B, the phase difference φ between GY1 and GY2 is obtained on the basis of a difference Δt between a time taken until the first acceleration GY1 rises up to the predetermined value GY1th due to a collision against a side surface of the vehicle and a time taken until the second acceleration GY2 rises up to the predetermined value GY2th due to the collision. FIG. 6A is a graphic illustration of the acceleration data GY1 and GY2 in a case in which the difference Δt (that is, the phase difference φ) is small, while FIG. 6B is a graphic illustration of the acceleration data GY1 and GY2 in the case of a large difference Δt (that is, the phase difference φ).

Subsequently, the phase difference φ is compared with a phase difference threshold φth (S15). If the phase difference φ is equal to or larger than the phase difference threshold φth (S15: No), a judgment is made that a collision against a side surface of the vehicle which causes a deformation of the vehicle occurs, and a side collision judgment threshold is put in a storage area of the RAM 30c (S16) and the operational flow then returns to the main routine.

On the other hand, if the phase difference φ is smaller than the threshold φth (S15: Yes), a judgment is made such that a collision against a side surface of the vehicle which causes no deformation of the vehicle occurs, a trip-over type judgment threshold is put in a storage area of the RAM 30c (S17) and the operational flow then returns to the main routine. That is, this is because the occurrence of a collision against a side surface of the vehicle but no deformation of the vehicle is accompanied with a high possibility of the occurrence of a trip-over type roll that a tire collides against a curb stone or the like so that the vehicle makes a roll.

Figure 4:
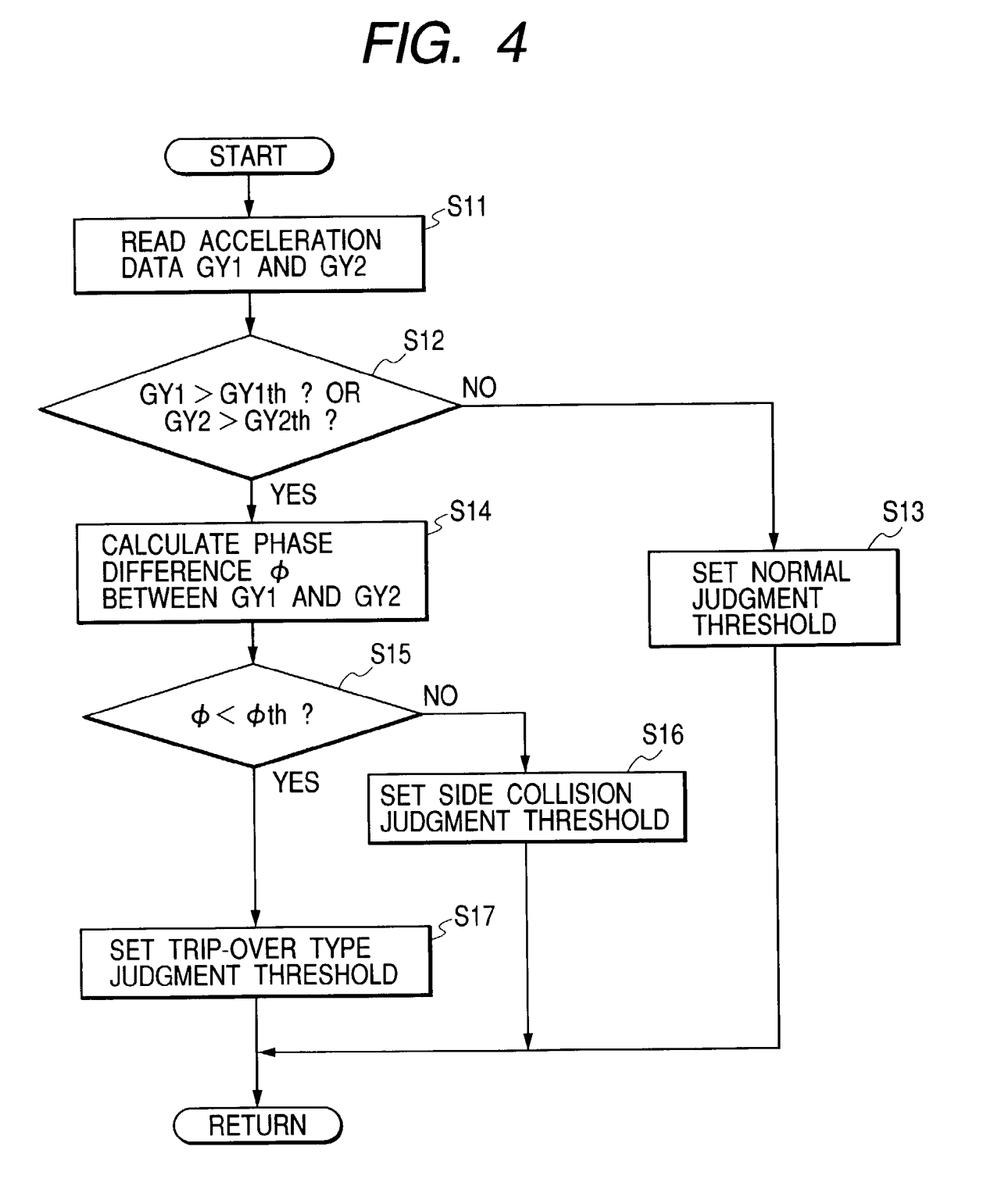
FIG. 4 is a flow chart showing a flow of processing of a roll judgment threshold switching routine.

In this case, the steps S11 and S12 in FIG. 4 correspond to the collision judging means 35 in FIG. 1, and the steps S14 and S15 in FIG. 4 correspond to the phase difference judging means 36 in FIG. 1. Moreover, the steps S11, S12, S14 and S15 correspond to the collision state discriminating means or the trip-over type discriminating means in the present invention, and the steps S13, S16 and S17 correspond to the threshold switching means 32 in FIG. 1.

Furthermore, a description will be given hereinbelow of each threshold to be set in the above-mentioned roll judgment threshold switching routine.

The normal judgment threshold signifies a roll judgment threshold to be used in a case in which a vehicle makes a roll at a relatively low speed, for example, when the vehicle runs on a slope or when the vehicle makes lane changes. In a two-dimensional map shown in FIG. 7, this normal judgment threshold is exemplified in the form of a threshold line S.

Moreover, the side collision judgment threshold signifies a roll judgment threshold to be used in a case in which a vehicle makes a roll at a relatively high speed due to the reaction of a collision causing a deformation of the vehicle. For example, it is also appropriate that the side collision judgment threshold is set to be the same as the normal judgment threshold (in this case, it appears as a threshold line S in the two-dimensional map shown in FIG. 7).

Figure 7:
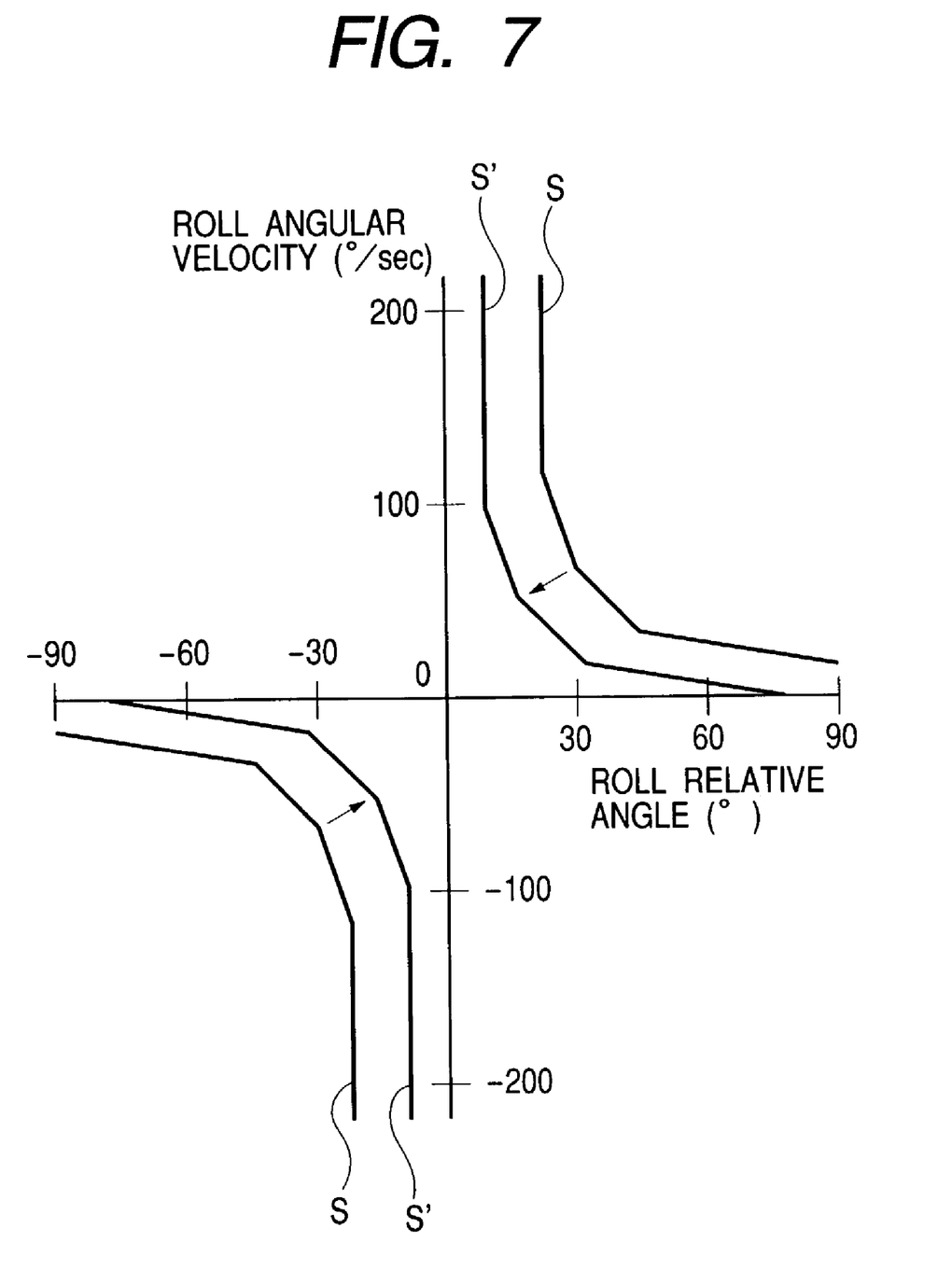
FIG. 7 is an illustration useful for explaining the switching between threshold lines on a two-dimensional map.

Still moreover, the trip-over type judgment threshold signifies a roll judgment threshold for a trip-over type roll which means that a vehicle collides against a curb stone or the like on a road to make a roll at a relatively high speed. In the two-dimensional map shown in FIG. 7, this trip-over type judgment threshold is exemplified as a threshold line S'. As shown in FIG. 7, the threshold line S' is set at a position closer to the origin 0 as compared with the threshold line S. This means that, in the case of the trip-over type roll occurring at a high rolling speed, the roll judgment is made at an earlier stage to activate the curtain air bag, as compared with the rolls of other types.

That is, in a case in which a vehicle makes a roll at a relatively, low speed, a judgment on the occurrence of a roll is made in accordance with a threshold condition, that is, in accordance with whether or not the history line based on the roll angular velocity ω and the roll relative angle θ exceeds the threshold line S in the two-dimensional map shown in FIG. 7. On the other hand, in a case in which the trip-over type roll stemming from a collision accompanied with no deformation of the vehicle occurs at a high possibility, the threshold line is shifted to the threshold line S' lying closer to the origin 0 on the two-dimensional map to employ the threshold line S' as the threshold condition so that the roll judgment is made at an earlier stage than normal to activate the curtain air bag 41 quickly.

As obvious from the above description, the passenger protection apparatus activation system 1 according to this embodiment can make a roll judgment at an appropriate timing corresponding to the type of roll to activate the curtain air bag 41 effectively. In particular, in a case in which the possibility of the occurrence of a trip-over type roll is high, the vehicle roll judgment is made at an earlier timing than normal, thereby activating the curtain air bag 41 quickly in a case in which the vehicle does a sideslip to make its tire collide against a curb stone or the like so that the vehicle falls rapidly into a rolling condition.

It should be understood that the present invention is not limited to the above-described embodiment, and that it is intended to cover all changes and modifications of the embodiment of the invention herein which do not constitute departures from the spirit and scope of the invention.

For example, although in the above-described embodiment the present invention has been applied to a passenger protection apparatus activation system designed to activate the curtain air bag 41 placed on a driver's seat side, the present invention is naturally applicable to a passenger protection apparatus activation system made to activate a curtain air bag provided for another seat.

In addition, although a curtain air bag has been employed as a passenger protection apparatus to which the present invention is applied, it is also appropriate that the present invention is applied to, in place of the curtain air bag, a different apparatus such as a seat belt with a pretensioner or an apparatus made to take up a seat belt in a repeated fashion through the use of a motor or the like. In brief, the present invention can be embodied as an activation device for all types of passenger protection apparatus to be activated at the time of the occurrence of a roll of a motor vehicle.

Still additionally, although in the above-described embodiment the normal judgment threshold and the side collision judgment threshold have been set to take the same threshold line, it is also appropriate that they take different threshold lines.

Moreover, although in the above-described embodiment the threshold condition is set on the basis of the occurrence or non-occurrence of a collision of a side surface of a vehicle and a phase difference in acceleration output between a plurality of G sensors, it is also appropriate that the threshold condition is set on the basis of, in addition to these factors, an output value of the angular velocity sensor 11.

Furthermore, it is also appropriate that the roll angle and the roll angular velocity are calculated through the use of an acceleration sensor as disclosed in Japanese Patent Laid-Open No. 2001-260785.

Still furthermore, it is also appropriate that, as disclosed in Japanese Patent Laid-Open No. (HEI) 7-164985, a roll of a vehicle is detected on the basis of the relationship between an inclination angle detected by an inclination angle detecting means and a tilting angular velocity detected by a tilting angular velocity detecting means. In this case, the border line between an operation area and a non-operation area may be changed therefor.

What is claimed is:

1. An activation device for a passenger protection apparatus which is made to activate said passenger protection apparatus in accordance with a behavior of a vehicle, comprising:

an angular velocity sensor for detecting a roll angular velocity of said vehicle;

relative angle calculating means for calculating a roll relative angle of said vehicle on the basis of the roll angular velocity detected by said angular velocity sensor;

roll judging means for making a judgment indicating the occurrence of a roll of said vehicle when the roll angular velocity detected by said angular velocity sensor and the vehicle roll relative angle calculated by said relative angle calculating means satisfy a predetermined threshold condition;

drive control means for activating said passenger protection apparatus when said roll judging means makes the vehicle roll judgment;

a plurality of acceleration sensors for detecting accelerations of said vehicle in lateral directions;

collision state discriminating means for making a discrimination of a collision state of said vehicle on the basis of the accelerations detected by said plurality of acceleration sensors; and threshold switching means for setting said predetermined threshold condition for the vehicle roll judgment in accordance with the collision state discriminated by said collision state discriminating means wherein said roll judging means sets a threshold line on a two-dimensional map using a roll angular velocity and a roll relative angle as parameters and makes a judgment indicating the occurrence of a roll of said vehicle when a history line drawn on the basis of the roll angular velocity detected by said angular velocity sensor and the roll relative angle calculated by said relative angle calculating means runs from a non-roll area lying on a side of an origin with respect to said threshold line to a roll area lying on a side opposite to said origin with respect to said threshold line, and said threshold switching means sets said threshold line in accordance with the collision state discriminated by said collision state discriminating means.

2. The device according to claim 1, wherein said plurality of acceleration sensors includes:

a first acceleration sensor located at a predetermined position of said vehicle for detecting and outputting a first acceleration; and a second acceleration sensor located at another predetermined position different from the first-mentioned predetermined position in right-hand and left-hand directions of said vehicle for detecting and outputting a second acceleration, and said threshold switching means includes:

collision judging means for making a judgment indicating the occurrence of a collision against a side surface of said vehicle when said first acceleration exceeds a predetermined value or when said second acceleration exceeds another predetermined value; and a phase difference discriminating means for, when said collision judging means makes a judgment that a collision against the side surface of said vehicle occurs, making a discrimination as to whether or not a phase difference between said first and second accelerations is below a predetermined phase difference, and said threshold switching means sets a normal judgment threshold line as said threshold line when said collision judging means makes a judgment indicating no collision against the side surface of said vehicle, and sets a trip-over type judgment threshold line as said threshold line when said collision judging means makes a judgment indicating the occurrence of a collision against the side surface of said vehicle and said phase difference discriminating means makes a discrimination of a phase difference between said first and second accelerations being below said predetermined phase difference, and sets a side collision judgment threshold line as said threshold line when said collision judging means makes a judgment indicating the occurrence of a collision against the side surface of said vehicle and said phase difference discriminating means makes a discrimination of a phase difference between said first and second accelerations being equal to or more than said predetermined phase difference.

3. The device according to claim 1, wherein said trip-over type judgment threshold line is set closer to said origin than said normal judgment threshold line and said side collision judgment threshold line on said two-dimensional map.

4. The device according to claim 1, wherein said passenger protection apparatus includes at least one of a curtain air bag designed to spread into a curtain-like configuration along a side surface portion of said vehicle, a seat belt with a pretensioner and an apparatus made to take up a seat belt in a repeated fashion through the use of drive means.

5. An activation device for a passenger protection apparatus which is made to activate said passenger protection apparatus in accordance with a behavior of a vehicle, comprising:

roll detecting means for detecting a rotation of said vehicle in its right-hand and left-hand directions;

roll judging means for making a judgment on a roll of said vehicle on the basis of a result of the detection by said roll detecting means;

drive control means for activating said passenger protection apparatus when said roll judging means makes a judgment indicating the occurrence of a roll of said vehicle;

a plurality of acceleration sensors for detecting accelerations of said vehicle in lateral directions; and trip-over type discriminating means for making a discrimination of a possibility of the occurrence of a trip-over type roll on the basis of a difference between the accelerations detected by said plurality of acceleration sensors, said roll judging means making a judgment indicating the occurrence of a roll of said vehicle at an earlier timing than normal when said discriminated possibility of the occurrence of the trip-over type roll is judged to be high.

6. The device according to claim 5, wherein said passenger protection apparatus includes at least one of a curtain air bag designed to spread into a curtain-like configuration along a side surface portion of said vehicle, a seat belt with a pretensioner and an apparatus made to take up a seat belt in a repeated fashion through the use of drive means.

7. An activation device for a passenger protection apparatus which is made to activate said passenger protection apparatus in accordance with a behavior of a vehicle, comprising:

roll judging means for detecting the behavior of said vehicle to make a judgment indicating the occurrence of a roll of said vehicle when the vehicle behavior detected satisfies a predetermined condition;

drive control means for activating said passenger protection apparatus when said roll judging means makes a judgment indicating the occurrence of a roll of said vehicle;

a plurality of acceleration sensors for detecting accelerations of said vehicle in lateral directions; and trip-over type discriminating means for making a discrimination of a possibility of the occurrence of a trip-over type roll on the basis of a difference between the accelerations detected by said plurality of acceleration sensors, said roll judging means making a judgment indicating the occurrence of a roll of the vehicle at an earlier timing than normal when the discrimination of the possibility of the occurrence of the trip-over type roll is judged to be high.

* * * * *